United States Patent
Dutra et al.

(10) Patent No.: US 6,917,979 B1
(45) Date of Patent: Jul. 12, 2005

(54) SYSTEM AND METHOD FOR MANAGING COMPLIANCE WITH SERVICE LEVEL AGREEMENTS

(75) Inventors: Antonio Dutra, Chicago, IL (US); Martin T. Wegner, Hoffman Estates, IL (US); Jack A. Stucky, Oxford, IN (US); Omprasad S. Nandyl, Yelm, WA (US)

(73) Assignee: Net2Phone, Inc., Newark, NJ (US)

(*) Notice: Subject to any disclaimer, the term of this patent is extended or adjusted under 35 U.S.C. 154(b) by 625 days.

(21) Appl. No.: 09/677,604

(22) Filed: Oct. 3, 2000

(51) Int. Cl.[7] .................. G06F 15/16; G06F 15/173
(52) U.S. Cl. .................. 709/229; 709/207; 709/223
(58) Field of Search .................. 709/217, 207, 709/223, 229; 370/322

(56) References Cited

U.S. PATENT DOCUMENTS

| | | | |
|---|---|---|---|
| 6,463,470 B1 * | 10/2002 | Mohaban et al. | 709/223 |
| 6,466,935 B1 * | 10/2002 | Stuart | 707/10 |
| 6,556,659 B1 * | 4/2003 | Bowman-Amuah | 379/9.04 |
| 6,628,629 B1 * | 9/2003 | Jorgensen | 370/322 |
| 2002/0181403 A1 * | 12/2002 | Shiraki et al. | 370/238 |
| 2003/0187966 A1 * | 10/2003 | Sinha | 709/223 |

* cited by examiner

Primary Examiner—Paul H. Kang
(74) Attorney, Agent, or Firm—Pillsbury Winthrop Shaw Pittman LLP (57) ABSTRACT

Compliance with subscriber job delivery requirements is managed and tracked. Job requirements set forth in service level agreements are stored electronically as delivery parameters. A queue manager creates a prioritized list of delivery jobs. A delivery manager delivers the jobs in accordance with the prioritized list. A routing manager determines optimal routes, e.g., least cost route for delivery of each job. Retries of jobs that are not successfully delivered can be performed. delivery job sources include broadcast subscribers, high- and low-priority single address subscribers, free subscribers and off-peak subscribers.

32 Claims, 7 Drawing Sheets

SYSTEM AND METHOD FOR MANAGING COMPLIANCE WITH SERVICE LEVEL AGREEMENTS

BACKGROUND

1. Field of Invention

The present invention is related to systems and methods for prioritization, processing and managing data content delivery needs that are competing for limited resources. More specifically, the present invention is related to managing service level agreements between subscribers and service providers to reduce the likelihood of breaches of those service level agreements.

2. Background of the Invention

Figure 1:
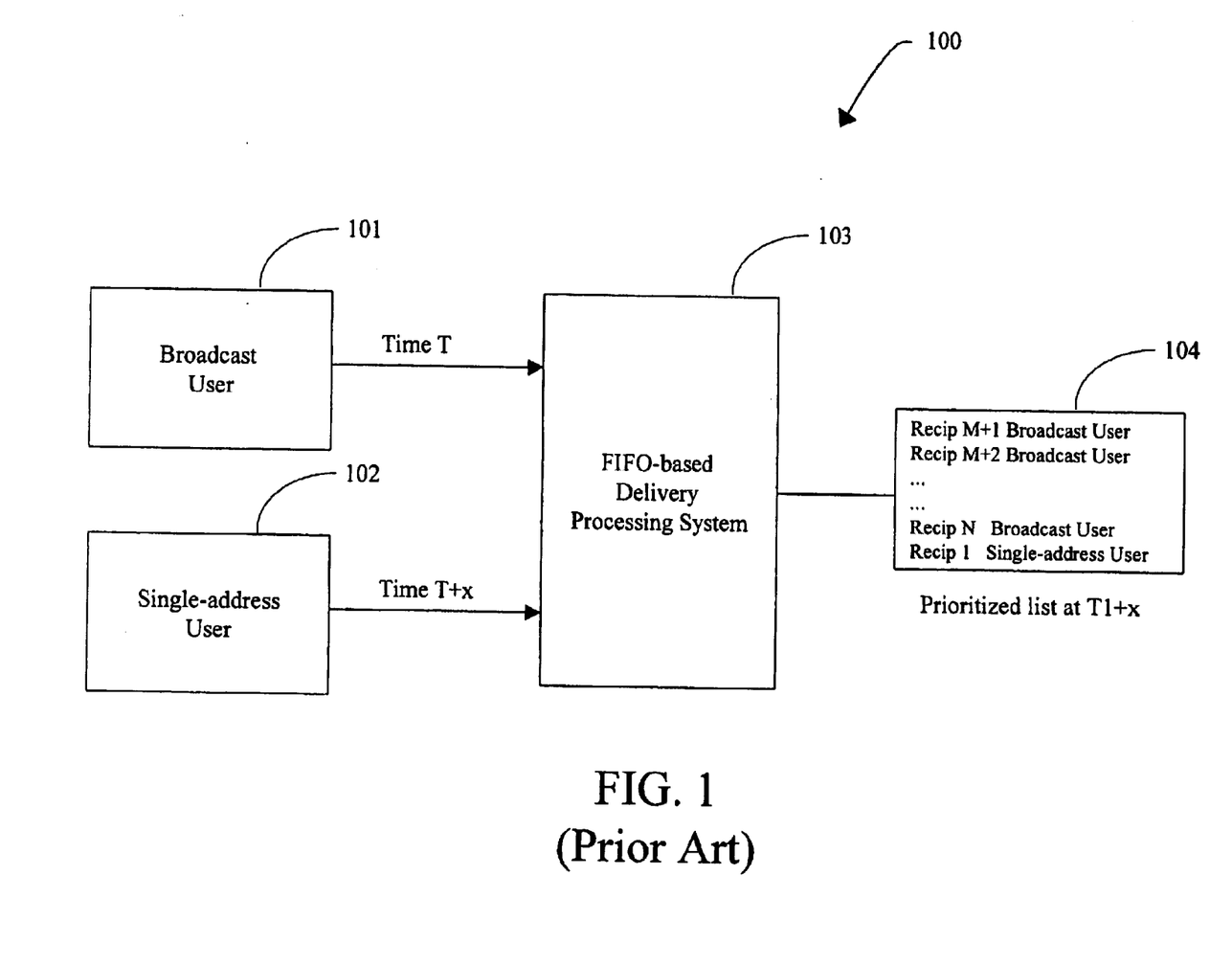
FIG. 1 is a schematic diagram of a prior art FIFO-based delivery processing system.

FIG. 1 is a schematic diagram of a conventional system where no priorities are assigned to particular job requests, i.e., jobs are processed on a first-in, first-out (FIFO) basis. Such systems suffer from a significant problem. Consider two user types: broadcast user 101 and single-address user 102. Broadcast user 101 submits at time T a request to send a message to N recipients. Single-address user 102 submits a request at time T+x (x is a positive value) to send a message to 1 recipient. In conventional system 100, a FIFO-based Delivery Processing System 103 maintains a prioritized list 104. Prioritized list 104 identifies the order in which recipient-jobs are to be processed, in this case, in first-in, first-out order. When single address user 102 submits the request at time T+x, Delivery Processing System 103 looks at prioritized list 104. Assume that at time T+x, Delivery Processing System 103 is assumed to have already delivered to M (M<N) recipients of the job entered by broadcast user 101. Because Delivery Processing System 103 operates on a FIFO basis, all of the N recipients of broadcast user 101's job are handled before single-address user 102's job. Consequently, a Service Provider using FIFO-based Delivery Processing System 103 would find it difficult, if not impossible, to guarantee a service level to single-address user 102, because a broadcast job could have priority and take a very long time to process.

Figure 2:
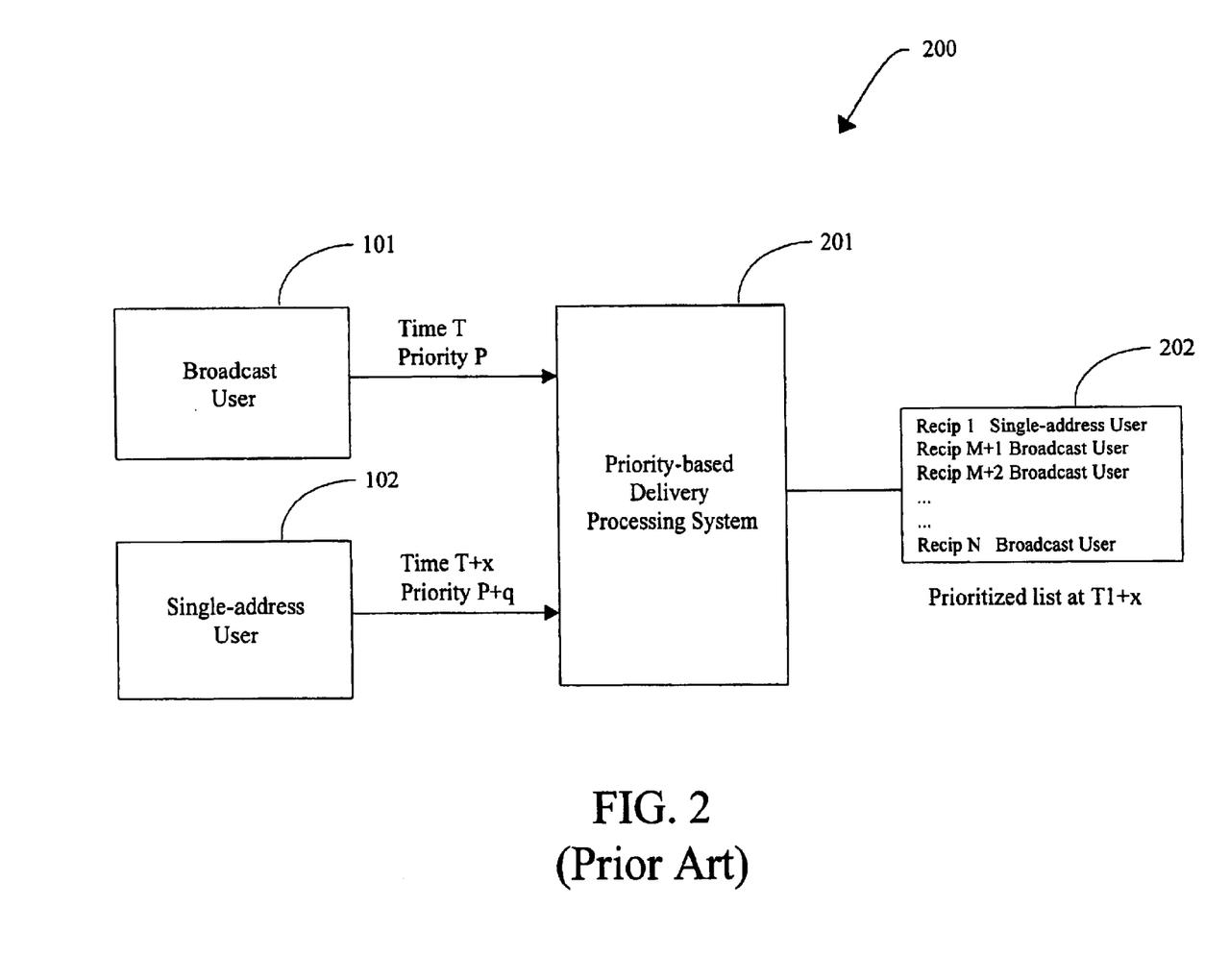
FIG. 2 is a schematic diagram of a prior art Priority-based delivery processing system.

FIG. 2 is a schematic diagram of a conventional system 200 where Priority-based Delivery Processing System 201 maintains prioritized list 202 based on priority, not time of entry, as was the case with prioritized list 104. In this example, the higher the priority value, the higher the placement of the recipient-job in prioritized list 202. Thus, if a single-address user 102's job is entered with higher priority than broadcast user 101's job, single user 102's job will not have to wait for the entire broadcast job to be processed. However, a Service Provider using Priority-based Delivery Processing System 201 has its own problem. If single-address jobs are given priority over broadcast jobs, it is conceivable that so many single-address jobs will be entered that broadcast user 101's job takes a very long time to process because it will keep being demoted in priority as new, higher-priority jobs are placed in the delivery queue. The terms "prioritized list" and "queue" are used interchangeably throughout the present specification. Consequently, a Service Provider would be unwilling to guarantee a service level to broadcast user 501 using Delivery Processing System 201.

Figure 3:
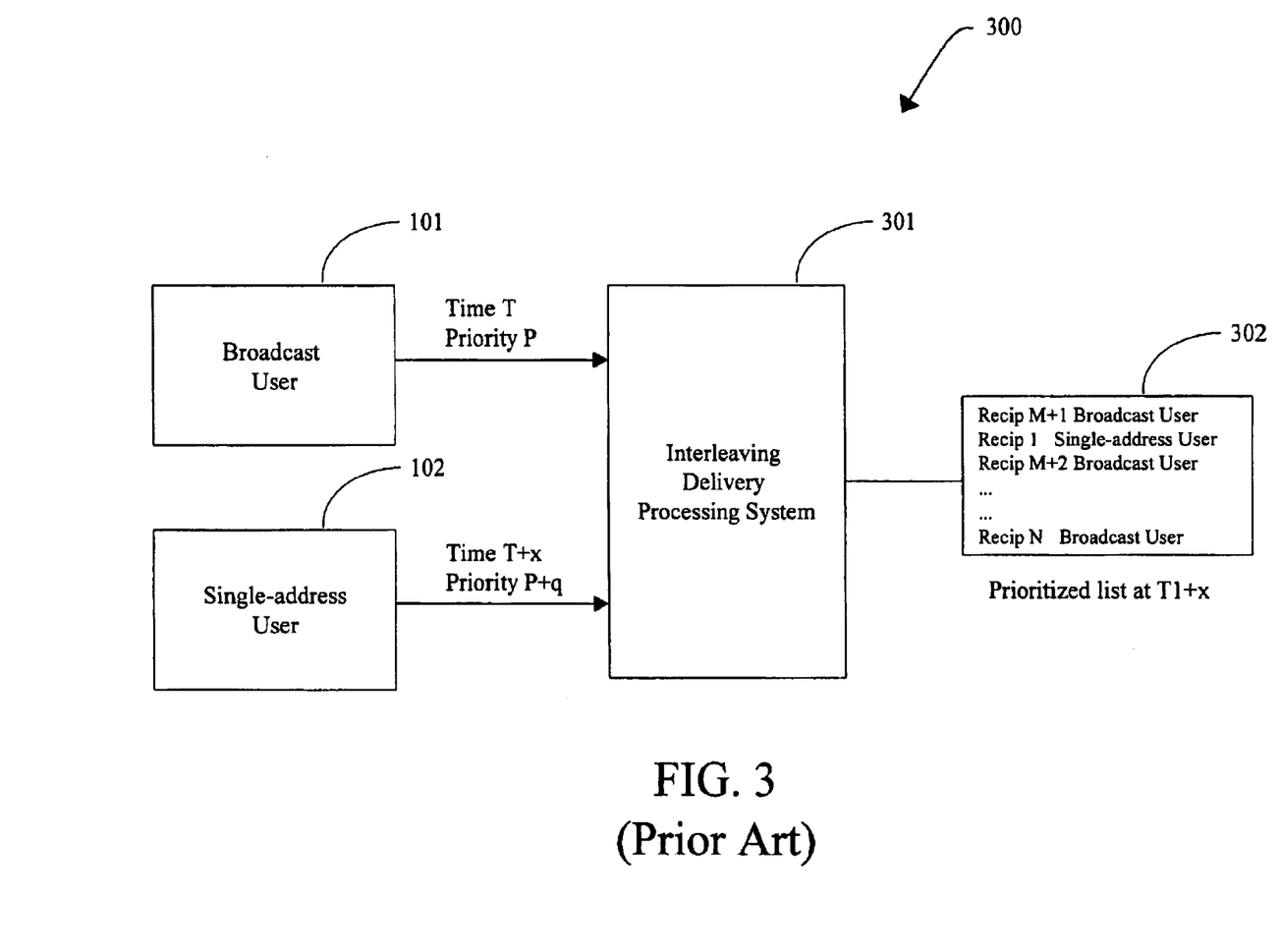
FIG. 3 is a schematic diagram of a prior art Interleaving-based delivery processing system.

FIG. 3 is a schematic diagram of a conventional system 300 where Interleaving Delivery Processing System 301 maintains prioritized list 302 based on a function of the current delivery queue and priority value of jobs to be processed. At time T+x, the incremental priority of single-address user 102's job is enough to move it up in the queue, but not high enough to overtake some existing jobs (e.g., recipient-job M+1). An exemplary interleaving scheme is to interleave at least one Priority P job at the top of the queue, putting single-address user 102's Priority P+q job second, then returning to broadcast user 101's recipient-jobs. If another job having Priority P+q were entered at time T+x, it would be placed fourth in the delivery queue, that is, another of broadcast user 101's recipient-jobs would be "interleaved" above it.

A delivery processing system that interleaves jobs still cannot reliably guarantee service levels to users. Such a system tries not to favor any type of user exclusively. Its intent, rather, is to avoid exceedingly long delays. Depending on traffic levels, however, the net effect can be to disappoint both broadcast user 101 and single-address user 102.

Service Providers have previously created restriction policies to resolve conflicts between broadcast and single-address users. As an example, a restriction is imposed on broadcast user 101 that any job originated by that user, where the number of recipients is greater than R, will be postponed until after a certain time (e.g., 11 p.m.). This time is typically when very few single-address jobs are originated. Interleaving Delivery Processing System 302, combined with this restriction policy, minimizes the chances of failed service level enforcement. However, such a system imposes undesirable restrictions on certain users.

A pro-active message delivery system, is described in U.S. Pat. No. 5,712,907 ("'907 patent"), which is hereby incorporated by reference herein in its entirety. In this system, a least-cost routing processor addresses one of the dynamic concerns of Delivery Processing Systems. This pro-active message delivery system routes each individual message, with potential delivery points throughout a network of delivery nodes, to a specific optimal node in the network, based on a least-cost routing algorithm. The disclosure in this patent describes a requirement to over-ride the least-cost choice, to accommodate a broadcast message requiring that all recipient-jobs be delivered within a certain time frame.

A-pro-active message delivery system as disclosed in the '907 patent introduces a further complication to the problem of service level enforcement. The service level agreement, in this case, is not on a recipient-job basis, but on a broadcast-job-wide basis. So, for example, if 90 of 100 recipient-jobs in a single broadcast are delivered within the guaranteed time frame, the Service Provider may claim to have been 90% successful in meeting its guarantee. However, the broadcast user's specification is that ALL deliveries must be made within that time frame, or else the Service Provider is deemed to have not met the requirements of the agreement. The '907 patent offered no solution to this problem. The interleaving algorithm offers no solution either. In fact, it works against the broadcast user demanding this service level because single-address users' jobs are continually entered and placed ahead of the recipient-jobs near the end of the broadcast user's recipient list.

A second problem with conventional Delivery Processing Systems is that there is no upward re-prioritization of a recipient-job on a prioritized list (e.g., prioritized lists 104, 202 or 302) after its initial placement on the list. Its only possible movement is downward in the list when other jobs having higher priority are entered at later times, and interleaved higher in the list. As a recipient-job nears the point at which its guaranteed delivery time is about to expire, there should be some mechanism to re-prioritize it to the top of a prioritized list.

This is one example of a general category of problems invoked as the Service Provider's delivery processing environment changes. It is not simply a matter of time, but of resources as well. Even the most sophisticated Interleaving Delivery Processing System 301 creates prioritized list 302 independent of the resources available. However, the relative priority of one job over another may be altered if available resources suddenly drop. Suppose, for example, that 10 telephone-dialing ports are available to make a phone call and 10 recipient-jobs are in the queue. A prioritized list could safely be ordered in any way, with no expected failure of a service level agreement. However, if immediately after the list is prepared, 5 of the ports become unavailable (e.g., system crash), the relative prioritization of the 10 recipient-jobs now becomes critical. Re-prioritization of a prioritized list by responding dynamically to system-wide environmental changes is a need that is unmet by conventional Delivery Processing Systems.

Conventional Delivery Processing Systems also treat the communication with a recipient to be one-way. That is, these systems assume that the end objective of message processing is message delivery. However, Service Providers might also provide message delivery services that anticipate a response from the recipient. For example, a Service Provider might provide an application that indicates the availability of 10 items for sale to a pre-determined, limited group of 100 potential buyers. Upon notification of such availability, each buyer can either respond with a request to buy, respond with a refusal to buy, or not respond at all. Moreover, the Service Provider may want to offer a service whereby "elite" subscribers get the first chance to purchase the item, followed by "high priority" subscribers, followed by "normal service" subscribers. Suppose, in the present example, that 5 subscribers are defined as elite, 25 as high priority, and the remainder as normal service subscribers. The service level agreement with elite and high priority subscribers might be that they be allowed 5 minutes to provide a buy response before the offer is delivered to the next level of service subscribers. Assume further that each subscriber has a wireless device, where the Service Provider delivers via "wireless push" protocols and the end-user responds via "wireless access" protocols.

Conventional Delivery Processing Systems do not permit deliveries to be staggered based on absolute and not relative priorities. Thus, this kind of service cannot be provided by conventional Delivery Processing Systems.

Another limitation with Conventional Delivery Processing Systems is that they treat prioritized lists as single lists, in which all jobs are queued in relative, interleaved priority order. However, all jobs are not always able to use all delivery resources. While a possible solution to this problem is to execute multiple instances of a conventional Delivery Processing System, this solution sets up competition for resources among Delivery Processing Systems, rather than the desired competition among jobs.

For example, one service conventionally provided by service providers for certain users is a free delivery service. The free delivery service is usually offered with some advertising attached to the delivered content. The free delivery service is generally offered at the lowest priority level of the system. Those same Service Providers may want to allow higher levels of service, to the same set of users, if those users will pay monthly or per transaction fees.

An exemplary Service Provider in this class is one with network nodes in multiple countries, which offers a no-transaction-fee email-to-fax service for deliveries within the same country, and transaction-fee-assessed email-to-fax service for international deliveries. In this example, the only delivery resources available to no-transaction-fee recipient-job users are those located within the country. For out-of-country recipient-jobs, all resources are available. A conventional Delivery Processing System, using a single prioritized list, cannot adjust to the availability or non-availability of a subset of the pool of delivery resources. So, for example, conventional Delivery Processing Systems postpone no-transaction-fee recipient-jobs when in-country resources are not available, while they process out-of-country recipient-jobs in their priority order.

Defenitions

The term "Job," as used herein, means any request to deliver a message or other data content to one or more computing systems or end user devices.

The term "Recipient-job," as used herein, means any one instance of a job, intended for delivery to one computing system or end user device.

The term "Retry," as used herein, means a subsequent attempt to deliver a message or other data content to a recipient, after the first attempt failed.

The term "Service Level" as used herein means criteria to which a job is to be completed. The service level is defined by one or more parameters in an SLA.

The term "Service Level Agreement ("SLA")," as used herein shall mean an agreement between a subscriber and a service provider that defines a service level by parameters. In a preferred embodiment of the present invention, the service level agreement is preferably a tabular format.

The term "Service Provider," as used herein, means any public or private organization, as an owned entity within an enterprise or as a separate entity offering its services to multiple enterprises, that offers the service of delivering messages and other data content from one computing system or end user device to another.

The term "Subscriber," as used herein, means any user that requests delivery services from a Service Provider.

SUMMARY OF THE INVENTION

Delivering messages from one user to another would be a trivial exercise for service providers if there were unlimited resources to make those deliveries, and the recipients were always available to receive those deliveries exactly when those deliveries are attempted. Typically, however, neither condition is likely to be the case for most applications that a Delivery Processing System handles. First, Service Providers who deploy the Delivery Processing System would prefer to deploy the minimum resources possible to handle all the message traffic their subscribers want. Second, much of the time, the Delivery Processing System must handle the non-availability of the called party (busy, no answer). To put out the best possible system with the minimum deployment of resources, Service Providers want to implement policies whereby the Delivery Processing System makes the most efficient use of available resources, while still meeting customers' minimum SLA expectations.

The present invention is directed to a delivery processing system and method that uses service level enforcement rules to minimize exposure to failing to meet service level agreements (SLAs). A Service Provider must have the capability to create SLAs for its subscribers, and then have a system that ensures the services are being delivered according to the SLAs. Subscribers require Service Providers to provide SLAs that clearly define the guaranteed performance of their services. SLAs generally have the form of a contract written between the Service Provider and the subscriber. Each SLA contains guarantees by the Service Provider to meet certain delivery time frames and delivery attempts. Failure to do so typically results in penalties that the Service Provider will have to pay its subscribers. These penalties can be realized in a number of ways, including reductions in service fees and delivery at no charge.

The present invention allows Service Providers to guarantee, track and monitor the delivery of services subject to SLAs to ensure they are in compliance with them. In addition, the present invention allows Service Providers to offer their subscribers a variety of premium service levels based on the subscriber's needs, including, for example, time-sensitive services, such as the delivery of X pages in Y minutes.

One embodiment of the present invention is a system for managing compliance with service level agreements. The system includes a storage device for storing information corresponding to at least one service level agreement. The system also has a policy manager to determine a service level agreement corresponding to each delivery job. A queue manager creates a prioritized list of delivery jobs to be delivered in accordance with the delivery jobs' priorities. The delivery jobs are delivered by a delivery manager.

Another embodiment of the present invention is a method for managing compliance with service level agreements. According to the method, information corresponding to service level agreements is stored. Priorities for each of a multiple of delivery jobs is determined using the stored information. A prioritized list is created in accordance with the priorities, and the delivery jobs are delivered in accordance with the prioritized list.

Thus, one object of the present invention is to prioritize delivery jobs in accordance with service level agreements to reduce or eliminate the likelihood that any service level agreement requirement is not met.

Another object of the present invention is to reduce service level agreement clauses to an electronic form that can be used to create a prioritized list of delivery jobs so that those clauses are met.

Another object of the present invention is to track status of delivery progress and compliance with service level agreements.

Another object of the present invention is to most efficiently complete delivery jobs using currently available resources.

Another object of the present invention is to allow Service Providers to guarantee a level of delivery service to subscribers.

These and other objects of the present invention are described in greater detail in the detailed description of the invention, the appended drawings and the attached claims.

DETAILED DESCRIPTION OF THE PREFERRED EMBODIMENTS

Figure 4:
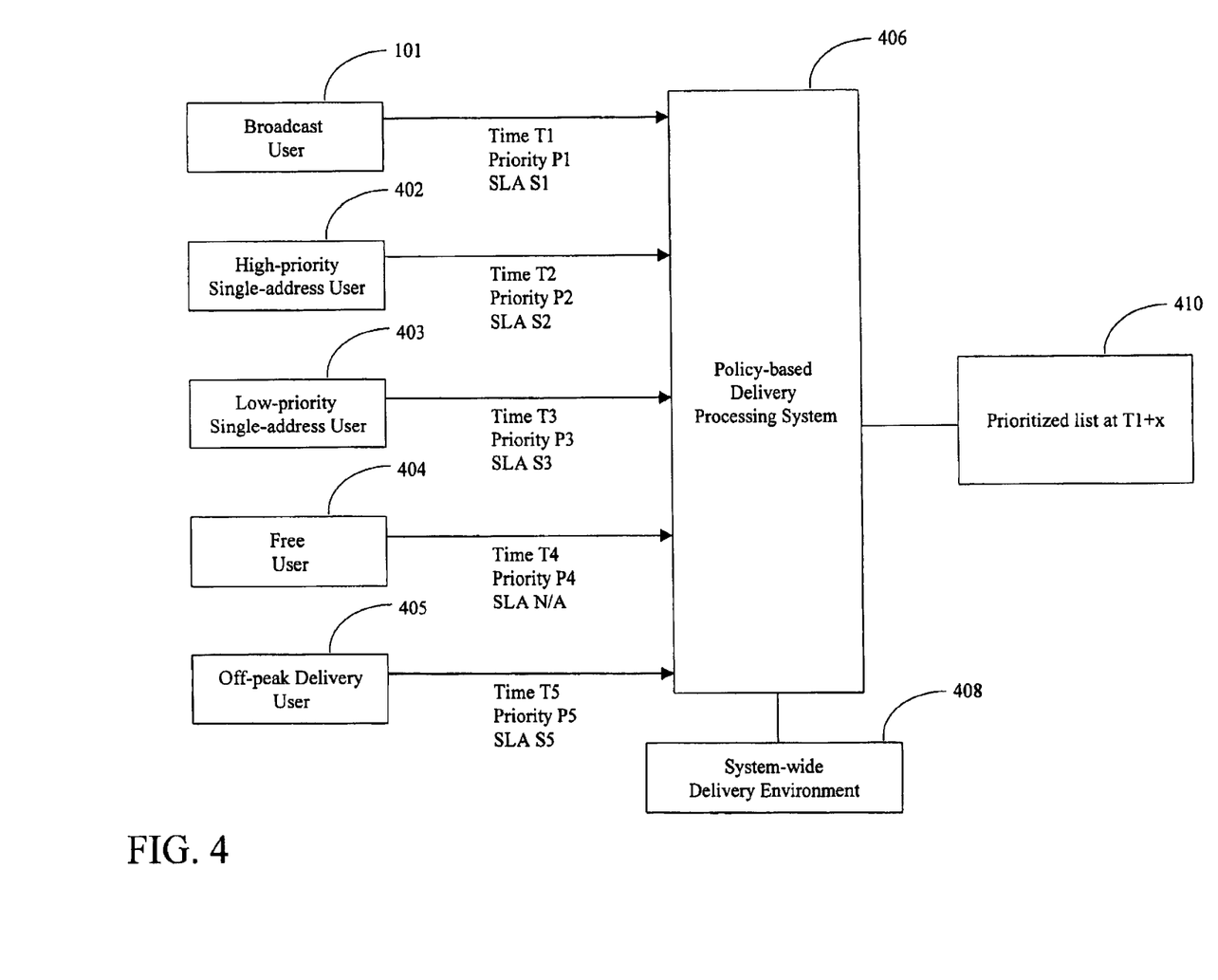
FIG. 4 is a schematic diagram of a preferred embodiment of the present invention.

FIG. 4 is a schematic diagram of a preferred embodiment of the present invention, using a Policy-based Delivery Processing System 406. Five types of users are illustrated in the preferred embodiment. These types are broadcast user 101, high-priority single-address user 402, low-priority single address user 403, free user 404 and off-peak delivery user 405. Single-address user 102 has been renamed as a High Priority Single-address User 402 to distinguish it from a Low Priority Single-address User 403. A Free User 404 has no specific SLA in force, since there is no penalty for failing to meet the SLA. Off-peak Delivery User 405 requests that its delivery jobs be placed in queue only when rates are lowest.

The preferred embodiment of the present invention also includes a System-wide Delivery Environment 408. System-wide Delivery Environment 408 is comprised of the current state and count of resources available to perform the tasks required to deliver the jobs listed in prioritized list 410.

Policy-based Delivery System 406 prioritizes recipient-jobs according to a set of rules. The rules are determined based on clauses in SLAs that a Service Provider may offer. The following are examples of such clauses:

1. Time to first delivery attempt

The SLA may state that the Service Provider must make at least one delivery attempt within a particular time frame. For each recipient-job, an elapsed-time measurement is taken from the time a job is originated (i.e., submitted to Policy-based Delivery Processing System 406) to the time a delivery to that recipient's address is first attempted. The elapsed time must not be greater than the "time to first delivery attempt." If the elapsed-time measurement is greater than the value of the time to first delivery attempt attribute, the SLA requirement has failed.

2. Minimum retry count

The SLA may state that the Service Provider must continue to make delivery attempts over a certain time period, and when that time period has expired, must have tried to make a minimum number of attempts.

Each recipient-job also carries a "time to last delivery attempt." This is the time at which the system "gives up" on the job, and assumes that the recipient cannot be contacted. This may be the case for many reasons. For example, when delivering to a fax machine, it will often not answer when it is out of paper. If there is no answer for over 2 hours, the information in the fax document may have become stale, or a phone call may have taken place to convey the information in the fax document.

Upon each failed delivery attempt, a count of attempts is incremented, and a retry is scheduled. For each recipient-job, a measurement is taken from the time a job is originated to the current time when a retry is scheduled. If this elapsed time is greater than the time to last delivery attempt stored in the SLA, the count of attempts is compared to the "minimum retry count." If the count of attempts is less than the minimum retry count, the SLA requirement has failed.

3. Minimum retry interval

It is conceivable that a Service Provider could meet the minimum retry count requirement simply by a rapidly retrying delivery attempts over a very short period. However, such action would likely be against the spirit of the SLA agreement. For example, suppose the job were to deliver a message to a fax machine. If the fax machine is busy at time T, it will likely be busy for a few minutes after that. The rapid retry of delivery attempts would likely fail because the current fax communication was still in progress.

The minimum retry interval parameter ensures that retries are spaced out, preferably being made at a time when a busy device is likely to be available again. This requirement is preferably implemented as a modification to the previous requirement. That is, the running count of attempts—for retries that will apply toward the required minimum retry count parameter—is incremented only if the time period between the current attempt and the last counted attempt is greater than the stored minimum retry interval value.

4. Absolute versus relative priority

Consider Job A as the only job with higher priority in the queue compared to Job B. Job A is processed first. In "relative" priority Job B goes to the top of the queue as soon as Job A begins processing, and is processed as soon as resources are available. That is, Job B's processing begins independent of Job A's completion state. In "absolute" priority, Job B's processing is dependent on some completion state of Job A. For example, as described above, when one message is being delivered to multiple recipients, it is sometimes necessary to identify absolute priorities among groups of the recipients. In such a case, recipients are stratified by class of absolute priority. Messages are delivered to recipients in the highest priority class first. The system waits for responses to the messages up to a predetermined time-out period. After responses are received or the expiration of the time-out period, the delivery system delivers the messages to the next group of recipients, and even then only based on the context of the message. For example, the message can indicate some threshold of positive responses from the entire group (e.g., number of items available to be sold). Once such a threshold has been reached, all further delivery attempts are canceled.

For example, one prioritization scheme for this case is to (a) deliver the item availability message to the 5 elite subscribers and wait for responses; (b) after all responses have been given, or the 5 minute period has elapsed without responses from some or all of the elite subscribers, deliver the item availability message to the high priority subscribers; (c) take buy responses from high priority subscribers on a first-respond, first-fulfill basis; and then (d) if there are any items still left after the next 5 minute period has elapsed, deliver the message to the remaining normal service subscribers and process their orders on a first-respond, first-fulfill basis. The prioritized list has to be so constructed so that certain recipient-jobs are not attempted until higher priority jobs reach final resolution (by a positive or negative response, or an elapsed time without a response).

5. Service level performance by job or by recipient-job

Clauses 1–4 can be construed as levels of service applied to specific recipient-jobs. However, as described above, there can be a requirement to allow a broadcast job to be treated in its entirety. One example is a broadcast job that is an announcement of a product for sale by auction. Assume the announcement is being delivered to 100 recipients, each of whom would want an equal chance to provide an initial bid. To avoid providing an unfair advantage to recipients who receive their message first, the messages must be sent to all of the recipients within roughly the same time frame (sometimes at exactly the same time).

6. Hard limit versus performance percentage guarantees

In clauses 1–5, the Service Provider may guarantee that it will never violate an SLA clause, or may guarantee only that it will not violate the clause more than a certain number of times, over a certain time period. For example, consider in clause 5 that the Service Provider's SLA specifies that it will make a first delivery attempt on all recipient jobs within 5 minutes of origination, at least 95% of the time, during the course of any one billing period (e.g., a month).

7. Subscriber versus group guarantees

There may be a difference between whether the SLA is given to an end user subscriber, or to a collection of subscribers. For example, a reseller of the Service Provider's services may represent only one "subscriber" to the Service Provider, but it is the performance of the Policy-based Delivery Processing System for all the end users of that reseller that counts towards meeting an SLA with the reseller.

The foregoing example clauses are not meant to be exhaustive, and other clauses can be used within the scope and spirit of the present invention. The present invention addresses each of these SLA clauses by using an algorithm that prioritizes recipient-jobs based on a ranking of assessed relative penalty or benefit values. It would be apparent to those having ordinary skill in the art that either relative penalty or relative benefit measures could be used. To simplify understanding, the present description is in terms of relative penalty value. Therefore, SLA clauses are transformed into penalty value-generating parameters, allowing the Policy-based Delivery Processing System to assign a value to the question "how much penalty will the Service Provider incur if the recipient-job being prioritized fails to meet an SLA clause?"

The present invention includes an algorithm that assigns penalty values to each recipient-job in prioritized list 410. Prioritized list 410 is re-prioritized upon successive, periodic or dynamically generated "sweeps" through the list. The algorithm is a function of any or all of the following parameter inputs:

a. The penalty value assigned to the job at the time of entry.

b. Time before failure to meet any SLA clause failure.

c. Modification to the penalty value as each SLA clause either reaches or approaches an expected delivery window close.

d. Modification to the penalty value of the job upon each re-prioritizing "sweep" through a prioritized list (e.g., prioritized list 410).

e. Time of job origination, or job delivery start time (for off-peak jobs in particular, this is different from job origination).

f. Resources available to deliver messages through a network of delivery nodes.

g Costs to use each of those resources for delivery.

The present invention also includes a means for identifying successes and failures of meeting SLA guarantees, notifying subscribers of such successes and failures as each recipient-job delivery is disposed of finally, and generating records for billing systems to identify such successes and failures.

Figure 5:
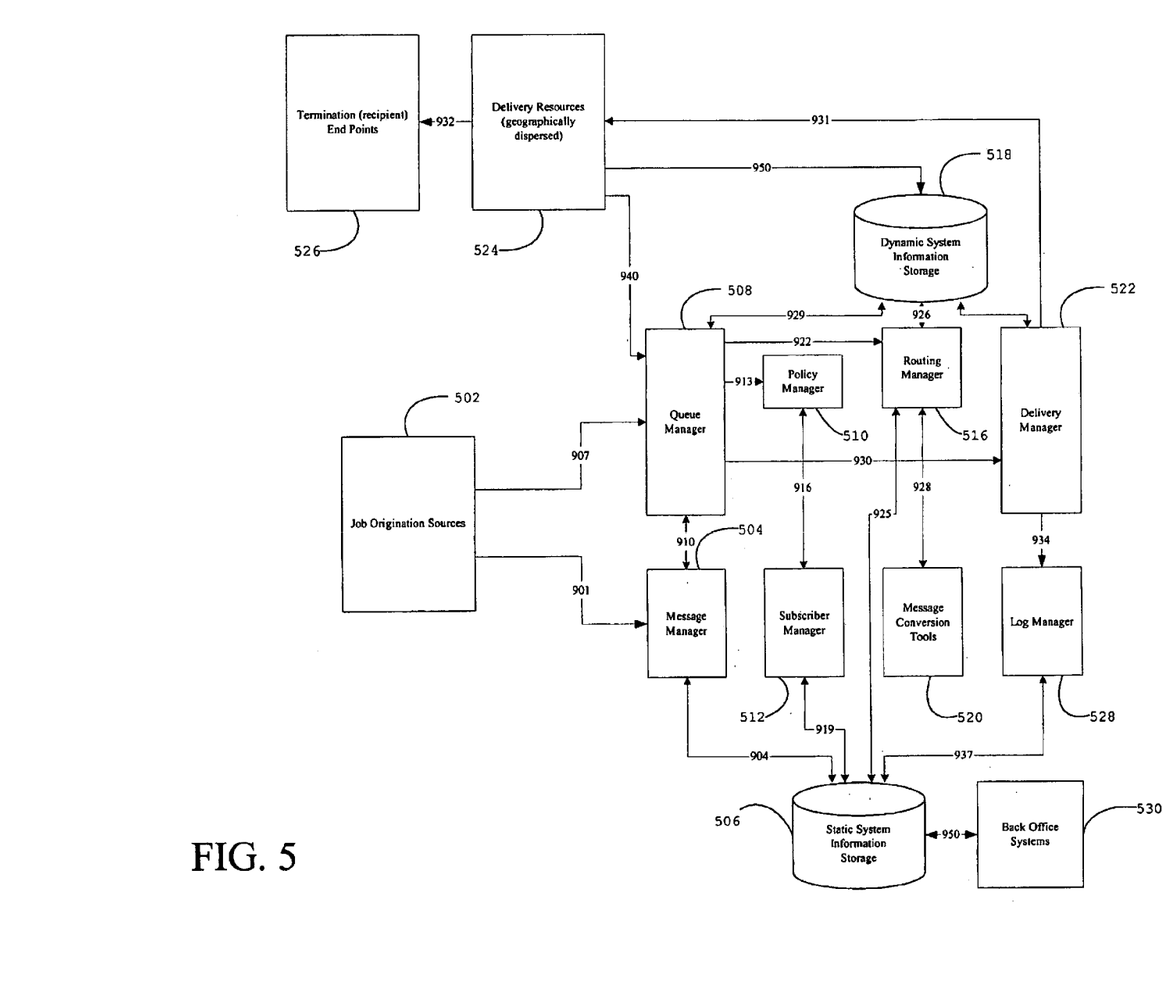
FIG. 5 is a schematic diagram of a preferred embodiment of a system-wide environment in which a Policy-based Delivery Processing System, as described in the present invention, is implemented.

FIG. 5 is a schematic diagram of a preferred embodiment of a system-wide environment in which a Policy-based Delivery Processing System according to a preferred embodiment of the present invention is implemented. In this figure, Job Origination Sources 502 is now identified as a collection of all previously identified job originators shown in FIG. 4 (i.e., job origination sources 101, 402, 403, 404 and 405).

Figure 5A:
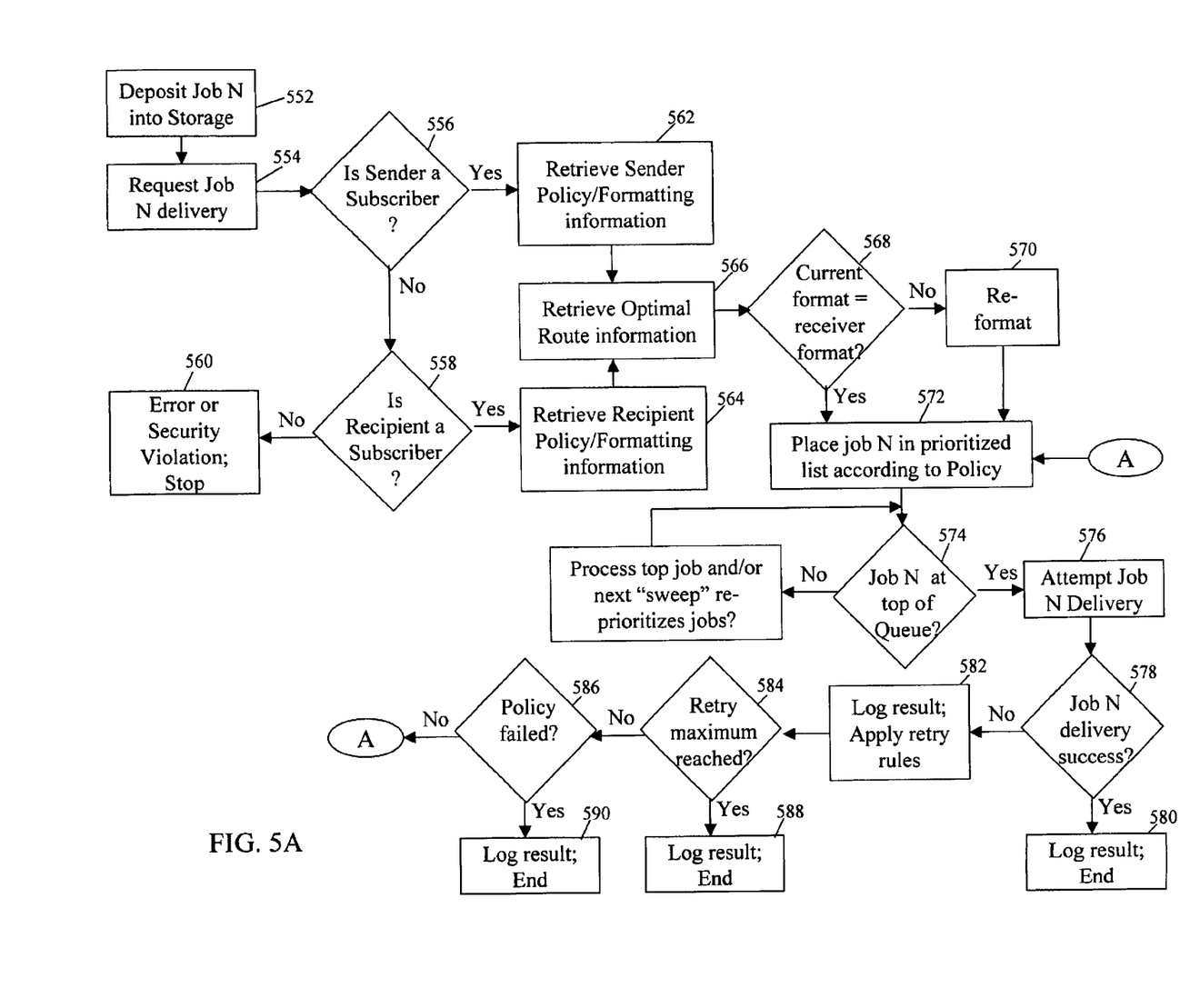

The Policy-based Delivery Processing System 406, shown in FIG. 4, is described with reference to the flowchart in FIG. 5A for a single job creation:

In step 552, a job is created by one of Job Origination Sources 502, and deposited through a Message Manager 504 into a Static System Information Storage 506, along paths 901 and 904, respectively.

In step 554, either that same source, another source, or an automated process also considered among the collection of Job Origination Sources 502, generates a request to deliver that stored job, and places that request with a Queue Manager 508, along a path 907.

Queue Manager 508 retrieves the job from Message Manager 504 along a path 910, and invokes a Policy Manager 510 along a path 913 to determine the original prioritization of this job. At this point, a job can either be originated by a subscriber, intended for a subscriber, or both. If it is originated by a subscriber (determined in step 556), policy rules for the originator will be administered before policy rules for the recipient (determined in step 558). If neither the sender nor the recipient is a subscriber, an error condition (for example, a security violation has occurred), and the process stops in step 560. Preferably, a reason for the error is displayed to the message originator, a system operator or both. Preferably the error is also logged in an error log.

Policy Manager 510 retrieves SLA (and other) information for this subscriber (originator in step 562 or recipient in step 564), through a Subscriber Manager 512, which gains access to Static System Information Storage 506 to obtain the SLA (and other) information This retrieval is processed along paths 916 and 919.

In step 566 Queue Manager 508 requests routing information (i.e., choice of delivery resource(s) to use) from a Routing Manager 516, along path a 922.

Routing Manager 516 determines how each recipient-job in the job should be delivered by reference to information previously stored in Static System Information Storage 506, along a path 925. Such information can include, for example, static information about the cost of delivery routes for specific job types. Information is also retrieved from a Dynamic System Information Storage 518, along a path 926. Such information can include dynamic information such as the non-availability of a specific geographically-located delivery node (e.g., system crash).

In step 568, Routing Manager 516 also determines whether the content type of a recipient-job matches the content type of the delivery resource. For example, in an email-to-fax application, an email message must be converted to a format that would allow delivery to a fax machine. Routing Manager 516 invokes Message Conversion Tools 520 for those re-formatting services, along a path 928 in step 570. Exemplary conversion tools and efficient routing algorithms are described in related, co-pending U.S. patent application Ser. No. 09/651,321, entitled "A Flexible Scalable File Conversion System and Method," which is hereby incorporated by reference herein in its entirety.

In step 572 Queue Manager 508 arranges priorities based on all the information currently known, and creates the previously-identified prioritized list 410, stored in Dynamic System Information Storage 518, along a path 929.

In steps 574 and 576 Queue Manager 508 takes the recipient-job at the top of the list and invokes a Delivery Manager 522, along a path 930, to make the delivery attempt.

Delivery Resources 524 is a collection of all delivery resources available to the system, identified by their capabilities (e.g., the ability to make a voice call) and their location (for least cost routing assessment purposes). Termination (recipient) End-points 526 is a collection of recipient devices and systems. Delivery Manager 522 creates a delivery path 931 to a specific recipient device or system, through an appropriate resource among Delivery Resources 524, along paths 931 and 932.

Whether the recipient-job delivery succeeds or fails (determined in step 578), Delivery Manager 522 generates records related to its processing tasks and delivers those records to Log Manager 528, along a path 934. If the recipient job succeeds, this processing is performed in step 580. The success of the job is reported to the job originator, a system operator or both, as well as logged. If the recipient job fails, this processing is performed in step 582, where retry rules are applied.

Log Manager 528, along a path 937, either passes that information directly into Static System Information Storage 506 or filters the information before doing so. One example of a reason for filtering information is to take multiple records related to a broadcast job and create a summary record.

If the recipient-job delivery failed because of non-availability of the recipient device, a job retry request, along a path 940, is initiated back through Queue Manager 508 in steps 584 and 586 through to step 572. The above sequence of events is set in motion again, as if the failed attempt constitutes another origination source. However, this time, as the job passes to Policy Manager 510 for assessment, retry rules are included in the algorithm. If the retry maximum is reached, then the job ends in step 588. If the SLA policy fails, the job ends in step 590. In either event, a notification message is sent to the job originator, a system operator or both, and a report of the error is generated.

Back Office Systems 530 is a collection of services and interfaces, such as user provisioning, message tracking, billing, and system management, that manipulate and report on information in Static System Information Storage 506, along path 950. Policies are created via one or more of the interfaces provided by back office systems 530. Subscribers are assigned to policies via another (or the same) interfaces provided by back office system 530. Exemplary interfaces are well known graphical user interfaces, including but not limited to HTML browser interfaces created for Internet users. Identifications of failure to meet SLA guarantees are processed through this path, either ad hoc through a user interface, or automated, such as via an alarm to an SNMP-compatible system monitoring functionality, such as HP Open View.

Delivery Resources 524 continually identify their current availability along path 950. This provides an "environmental feedback loop" that feeds the dynamic re-prioritization function of Queue Manager 508.

It would be apparent to those having ordinary skill in the art that the sequence of events presented here is one of many variations whereby prioritized list 410 can be created. For example, conversions can be applied at any point in the process (e.g., by Message Conversion Tools 520) with little or no impact on the resulting relative priorities.

Figure 6:
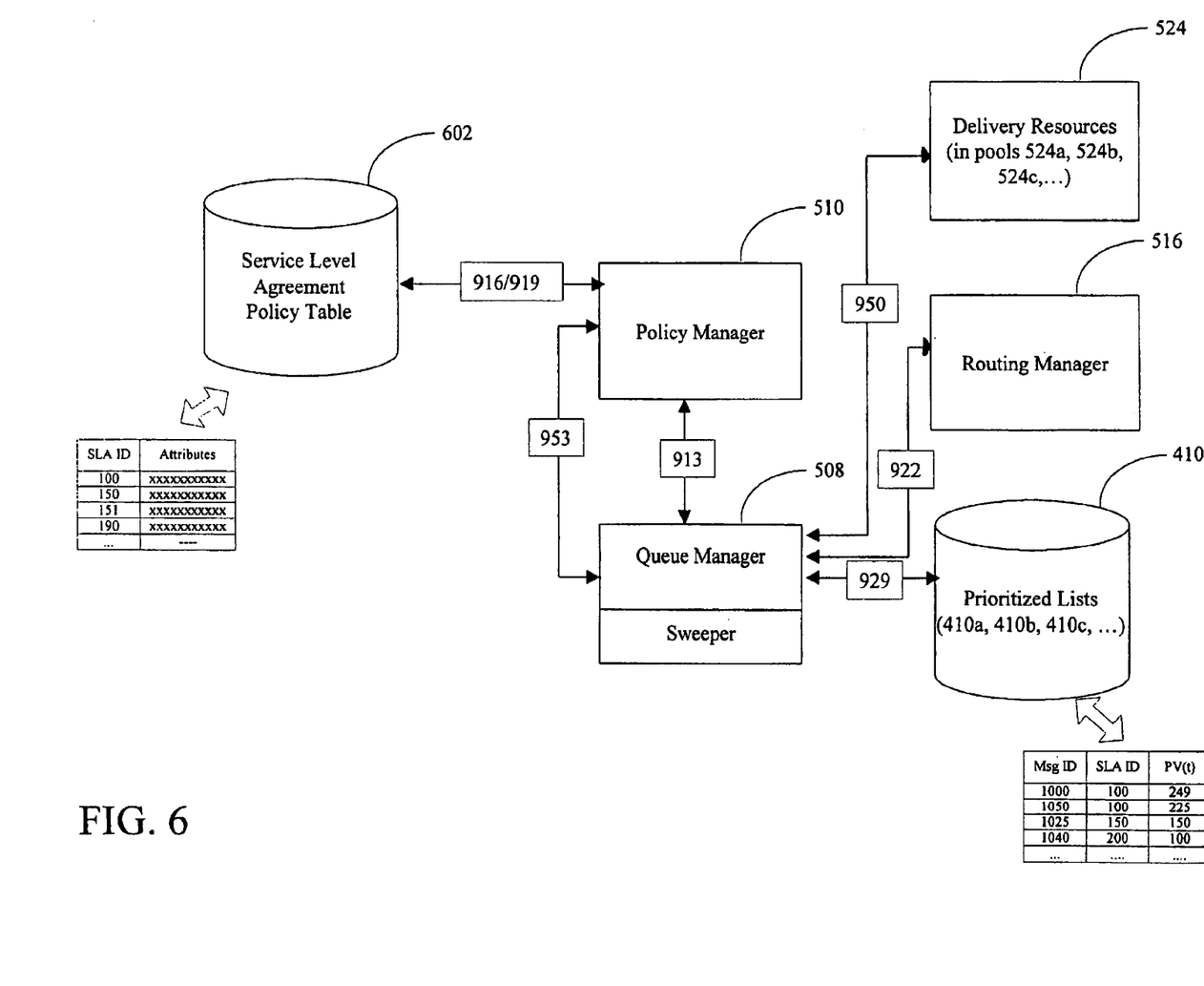
FIG. 6 is a schematic diagram of the Delivery Processing System components directly involved in creating a prioritized list of recipient-jobs.

FIG. 6 is a schematic diagram detailing creating a prioritized list 410 using the information generated by the steps illustrated above.

As shown in FIG. 6, Static System Information Storage 506 contains a Service Level Agreement Policy Table 602. SLA Policy Table 602 maintains information on SLA policies, including an SLA Identification and one or more of the following attributes (delivery parameters):

Broadcast Threshold

Subscribers may be allowed both single-address jobs and broadcast jobs. When a job is entered, the number of recipients is counted. If the number of recipients is greater than the threshold value, the job is treated as a broadcast job. The corresponding "broadcast SLA ID" is the effective SLA ID to use when the threshold is exceeded.

Delivery Start Dependency

This is a pointer to an algorithm that is context-sensitive. As described above, a broadcast job may be entered where the recipients fall into different classes of prioritization, wherein delivery to the lesser classes depends upon the delivery and response performance of the higher classes. In most cases, the algorithm is composed of an expiration time and a condition of a count of successful deliveries or responses. In a preferred embodiment of the present invention, the delivery start dependency parameter is chosen to allow for cases where a success measurement is largely independent of the count. For example, in an auction, the dependency may be "total dollars committed to" by respondents, rather than "total number of units ordered".

Time to First Delivery Attempt

For each recipient-job, a measurement is taken from the time a job is entered into the Delivery Processing System to the time its recipients' addresses are first attempted. This elapsed time must not be greater than the "time to first delivery attempt" (or else the SLA requirement has failed). The subsequent disposition, upon failure to meet this requirement of the SLA, is to continue with the rest of the SLA (that is, failure to attempt delivery of the job prior to the value of the time to first delivery attempt parameter does not constitute an "end condition"). If the Service Provider wants to offer a service whereby the job would be canceled for failing to meet this requirement, it should set the "time to last attempt" parameter (described below) to the same value as the time to first delivery attempt.

Time to Last Attempt

For each recipient-job, a measurement is taken from the time a job is entered into the Delivery Processing System to the current time when a retry is scheduled. If this elapsed time is greater than the time to last attempt parameter stored in the SLA, the queued job should not be attempted. In and of itself, this is not a failure of the SLA, though it may be a failure of the job. The SLA will have failed if this time is reached and either the retry count or retry interval portions were not met (see below). If neither of those conditions failed, but the time limit has expired, the "end condition" is "time to last attempt expired", and the subsequent disposition is either to cancel the job or move to another SLA.

Off-peak Delivery User 405 may have entered a job, where the off-peak time has been identified as 11pm. As described above, for such a use, the time to last attempt delivery parameter is set to the "job delivery start time." This value, combined with the time to last attempt value, gives Service Providers a chance to offer a "delivery window". The job delivery start time becomes, effectively, the time at which the job is entered into the Delivery Processing System for SLA purposes. So, suppose the window is 11 pm to 6am. The job delivery start time value is set to 11 pm, and the time to last attempt value is set to 7 hours. If the service were such that the job would have to wait again, until 11 pm the next night, the job should be re-queued with the job delivery start time parameter and SLA policy.

There is also a relationship between the time to last attempt attribute and a "cancel after" value that may have been entered by the job originator. This is a situation where, for example, the sender does not want any attempts made after Friday, Feb. 18, 2000, at 5 pm. Generally, this value corresponds to the time after which the content of the message is no longer valid. So, for example, a sale price of an item for sale may only be in effect until that date, at that time. However, the SLA for the job might allow delivery attempts for up to 8 hours. The 8 hours could span the time at which the message is no longer valid. The "cancel after" parameter should take precedence, and the system should stop delivery attempts even if the time to last attempt parameter has not expired.

Initial Penalty Value

This is a priority value placed on the job at the time it is entered into the Delivery Processing System. The higher the value, the higher the penalty. When two jobs are in the same queue, the one with the highest penalty value is attempted first.

Penalty Increment or Decrement on each Successive "Sweep"

A job's penalty value can be increased or decreased over time, as the Delivery Processing System "sweeps" through the queue and bypasses action on a particular job. This allows a job that may have started with a low penalty value to move out of that low priority status. Otherwise jobs having a higher priority would always displace the lower-priority job's place in the queue.

Note that this attribute is especially important for jobs in retry mode, and affects the minimum retry count and interval delivery parameters described below. The penalty increment or decrement attribute provides the Delivery Processing System with a way to move jobs up in the queue, so that minimum retries can be met.

Minimum Retry Count

This value indicates the minimum number of retries that the Service Provider guarantees to the sender that it will attempt, prior to when the elapsed time is greater than the "time to last attempt" attribute described above. For any job, when the "time to last attempt" time has been reached, the Delivery Processing System checks to see that the minimum retry count has been met. If it has not, then there is a failure to meet this requirement of the SLA. The end/error condition is "failure to provide SLA retries in SLA attempt window." The subsequent disposition is either to cancel the job or move to another SLA.

Minimum Retry Interval

Preferably, the running count of retries—for those retries to be counted against the "minimum retry count"—is incremented only if the time period between the current attempt and the last counted attempt is greater than the value stored in the minimum retry interval attribute. This implies that there are two counts of retries—the actual number of times the phone number is attempted, and the number of times that count against the SLA. A retry only counts against the SLA if the minimum interval is exceeded; but that does not limit the Delivery Processing System from making other attempts. For any job, when the "time to last attempt" time has been reached, the Delivery Processing System checks to see that the minimum retry count has been met. If the minimum retry count has not been reached by the expiration indicated in the time to last attempt parameter, then the SLA has not been met.

The information on whether particular SLA clauses are hard limits or based on performance percentages is stored in subscriber or group profile records on Static System Information Storage 506. This information is available through Subscriber Manager 512.

Delivery Resources 524 is illustrated in FIG. 6 as a series of Delivery Pools 524a, 524b, 524c, and so on. Prioritized list 410 is illustrated in FIG. 6 as a series of prioritized lists 410a, 410b, 410c, and so on, corresponding to Delivery Pools 524a, 524b, 524c respectively. Each Delivery Pool 524 represents a group of resources available for a particular delivery type. There is one prioritized list 410 for each delivery pool 524. This allows Queue Manager 508 to maintain relative penalty value rankings competing for like delivery resources.

Retry processing is an important subset of service level agreement processing. It is necessary to define the concept of "purposeful" retries. This is needed because the reason for a failed attempt may suggest that no further retries will succeed. The Service Provider will have to explain to its customers that the "minimum retry count" may not be met because no further purposeful retries could be made. This means that the job could fail before the entire SLA could be processed. The Delivery Processing System has to allow for the following retry determinations, so that the Service Provider can identify purposeful retries:

a. Failed try due to a bad recipient address. No further purposeful retries can take place.

b. Failed try due to a non-compatible recipient device. For example, one delivery attempt is intended to be to a fax machine, and instead a voice device, e.g., an answering machine is detected. Because many people have combination voice/fax phone numbers, the first attempt may fail, but it will alert the called party to switch to fax mode in time for the second attempt. In this case, a second attempt should be made soon (the Delivery Processing System can be programmed with a default value of X1 minutes). If the second attempt fails, it can be assumed that the called party is not a fax machine, and no further purposeful attempts should be made.

c. Failed try due to no response from the recipient device. With fax transmissions, this typically happens either because the memory on the receiving fax machine is full, or it is out of paper. So, a purposeful retry in this case is warranted, but the Delivery Processing System's default value is to wait X2 minutes to allow the called party to rectify the problem.

d. Failed try due to current non-availability of the recipient device (e.g., a busy signal). All retries after seeing a busy signal are "purposeful," subject to the "minimum retry interval" attribute noted above.

Service Providers are allowed to set the X1, X2 and maximum retry interval values as they wish.

The communication between Queue Manager 508 and Policy Manager 510 is one whereby jobs are passed to Policy Manager 510 for penalty assessment, and the penalty value, plus any delay in job delivery start time, is returned. The penalty value assessment algorithm is a mathematical function dependent on values assigned to the SLA attributes described above, as well as the current time, and the relation between the current time and the expiration of any expected delivery time. This is a first-pass calculation.

Below is an example of multi-level policy setting, whereby Policy Manager 510 can create a first-pass calculation of penalty values for jobs from the various origination sources shown in FIG. 4.

Multi-level Policy Setting Example

The following is an exemplary application of Delivery Processing system according to a preferred embodiment of the present invention. In the example, four general SLA policies are defined: High, Low, Free, and Off-peak, with broadcast capabilities available to all but the Free level of service. These service levels (High, Low, Free and Off-Peak) are defined as follows:

Policy=HIGH

This policy is further split into "normal" and "broadcast". The following are processing goals:

Normal jobs. The first attempt should be within 5 minutes of entry. Continue attempts for two hours, making at least five attempts separated by 10 minutes each (at least). Only two exceptions to being highest priority: (a) Broadcast or low priority job about to miss first attempt window; (b) Minimum retry count has been satisfied and other job about to miss end of window.

Broadcast jobs. These are identified as jobs submitted by HIGH priority subscribers where the number of recipients is greater than 50.

The first attempt should be within 30 minutes of entry. The same retry requirements as for normal "HIGH" priority jobs apply.

The agreement with subscribers of HIGH priority is that, for any job that fails to meet these SLA requirements, there will be no charge to the subscriber, even if the job is ultimately successfully delivered. There are no limitations or restrictions on use by the subscriber.

Policy=LOW

This policy requires a first attempt within 15 minutes, and a two hour window with at least five attempts separated by 10 minutes each.

The agreement with subscribers of LOW priority is that, for any job that fails to be attempted within the first 15 minutes, there will be no charge to the subscriber, even if the job is ultimately delivered successfully. However, after that, the Service Provider promises only a "best efforts" attempt to meet the retry requirements. If the two hour time limit is reached, regardless of the number of retries attempted, it will discontinue efforts to deliver. There are no limitations or restrictions on use by the subscriber.

Policy=OFF-PEAK

This policy has the same requirements as the LOW priority, but every job entered by subscribers of this service is posted for delivery after 11 pm on the date of entry. Typically, high-volume broadcasters are assigned to this category.

Policy=FREE

This policy has no requirements, and delivery attempts can be made for up to four hours. However, the Service Provider wants to impose limitations on how this FREE service can be used:

1. Does not want to incur charges for more than 100 pages per month per subscriber.

2. Does not want to deliver out of country. In the example embodiment of the present inventions, the Service Provider provides an international service, so that a FREE service is offered in both the United States and in Mexico, for example. However, free subscribers in the U.S. can only send to U.S. phone numbers and free subscribers in Mexico can only send to Mexico phone numbers. Additionally, Queue Manager 508 should never pick a route outside the country to deliver into the country.

3. Does not want any of its subscribers to dominate a port for a long period with a long fax. Thus, in the example, fax size is limited to no more than 20 pages.

Service Level Agreement Policy Table 602 Records

Service Level Agreement Policy Table 602 records must be created to implement the priority scheme. Additional consideration for the present example are as follows:

1. The primary SLA identifiers will be:
   ID=100 for the HIGH policy. If the broadcast limit is hit (i.e., 50 or more message deliveries in a given job), the policy invoked is ID=150.
   ID=200 for the LOW policy and ID=250 for the Off-Peak policy.
   ID=300 for the FREE policy.
2. The order of desired priority, from highest to lowest, should be:
   a. HIGH-NORMAL in its last minute before the two hour window.
   b. HIGH-BROADCAST in its last minute before the two hour window.
   c. LOW or Off-Peak in its last minute before the two hour window.
   d. HIGH-NORMAL in its last minute before the first attempt window.
   e. HIGH-BROADCAST in its last minute before the first attempt window.
   LOW or Off-Peak in its last minute before the first attempt window.
   g. Any HIGH, LOW or Off-Peak job in its normal retry cycle.
   h. FREE job.
3. Since HIGH-BROADCAST, LOW or OFF-PEAK jobs incur penalties if the first time limit is not met, and in order to raise the lower-priority jobs above HIGH-NORMAL jobs, these lower-priority jobs require 2 different settings, one for the X−1 minutes up to the first attempt commitment, and one for the last minute preceding the first attempt commitment.
4. In order to handle the last minute before expiration, it is also necessary to create additional records for those SLA situations. These are designated by IDs 151, 190, 251 and 290.

In the implementation of the present example, HIGH-NORMAL jobs start with an Initial Penalty Value 130. The penalty value for HIGH-NORMAL jobs is incremented by 1 for each sweep through the queue, where the time period between sweeps is assumed to be 1 minute. At the end of its first 4 minutes, a HIGH-NORMAL job will therefore have a penalty value of 134. At the $119^{th}$ minute, it will have a penalty value of 249. This is the basis for all other penalty value decisions. Table 1 is a table containing example SLA parameter values that will implement the criteria described above for the present example.

Times are given in seconds. A "<NULL>"value indicates that the SLA has no value for the particular parameter. The "delivery start dependency" parameter is outside the scope of the current example; it would normally hold the name of the script to apply to support the requirement. In the preferred embodiment of the present invention, when the system is at its last opportunity to send before a policy fails, all high-priority jobs, whether single or broadcast, are treated the same way.

Table 2 is a table containing penalty values resulting from applying the settings in Table 1 to originated jobs under each of the 4 distinct policies, over a two-hour time period. Note that lower priority jobs HIGH-BROADCAST (SLA ID 150) and LOW (SLA ID 200) or OFF-PEAK (SLA ID 250) switch to the SLA IDs 151, 251 and 251 respectively when they enter the $14^{th}$ minute, due to the 15 minute time to first attempt setting. They switch back to their original values after the $15^{th}$ minute.

TABLE 2

| Policy | Entry | 4 minutes | 14 minutes | 29 minutes | 60 minutes | 119 minutes |
|---|---|---|---|---|---|---|
| HIGH-NORMAL | 130 | 134 | 144 | 159 | 190 | 249 |
| HIGH-BROADCAST | 100 | 104 | 133 | 148 | 179 | 248 |
| LOW or OFF-PEAK | 90 | 94 | 132 | 147 | 178 | 247 |
| FREE | 10 | 10 | 10 | 10 | 10 | 10 |

Modifying Penalty Values based on Environmental Feedback

Queue Manager 508 can adjust first-pass (or initial) penalty values based on information available from Delivery Resources 524 and-Routing Manager 516. This information is provided along paths 950 and 922, respectively. Adjustments to first-pass penalty values can be made for several reasons. A non-exhaustive list of such reasons follows:
a. Alternate use of delivery pools. As noted, individual prioritized list 410a corresponds to Delivery Resource Pool 524a, and so on, but some pools can act as alternates to the others. For example, a Service Provider might want to consider different prioritized lists for fax deliveries, voice message deliveries, data content deliveries, that is, a separate prioritized list for each content type. As a first example consider that a Service Provider might want to limit an in-country delivery only to in-country delivery resources on the first-pass. However, as a parameter such

TABLE 1

| SLA ID: | 100 | 150 | 151 | 190 | 200 | 250 | 251 | 290 | 300 |
|---|---|---|---|---|---|---|---|---|---|
| SLA Descriptor: | High-Norm | High-Many1 | High-Many2 | High-Last | Low1 | Off-peak | Low2 | Low-Last | Free |
| Broadcast Threshold: | 50 | <NULL> | <NULL> | <NULL> | <NULL> | <NULL> | <NULL> | <NULL> | <NULL> |
| Broadcast SLA ID: | 150 | <NULL> | <NULL> | <NULL> | <NULL> | <NULL> | <NULL> | <NULL> | <NULL> |
| Delivery start depends: | <NULL> | <NULL> | <NULL> | <NULL> | <NULL> | <NULL> | <NULL> | <NULL> | <NULL> |
| Time to first attempt: | 300 | 1740 | 60 | 60 | 840 | 840 | 60 | 60 | <NULL> |
| Time to last attempt: | 6600 | 1740 | 5400 | 600 | 840 | 840 | 6300 | 600 | 14440 |
| Initial priority: | 130 | 100 | 133 | 248 | 90 | 90 | 132 | 247 | 10 |
| Priority increment: | 1 | 0 | 1 | 0 | 0 | 0 | 1 | 0 | 0 |
| Minimum retry count: | 5 | 1 | 5 | 3 | 1 | 1 | 5 | 3 | 3 |
| Minimum retry interval: | 10 | 10 | 10 | 2 | 10 | 10 | 10 | 2 | 2 |
| End-condition SLA switches | | | | | | | | | |
| Time to last expired: | 190 | 151 | 190 | <NULL> | 251 | 251 | 290 | <NULL> | <NULL> |
| Min retries not met: | 190 | 151 | 190 | <NULL> | 251 | 251 | 290 | <NULL> | <HULL> | as "time to first delivery attempt" comes close to failure, Queue Manager 508 could determine that an out-of-country resource might cost more, but is necessary to meet the SLA policy. This, then becomes an additional input to the penalty value calculation, whereby the incremental cost of using an alternate delivery pool adds a penalty cost that is lower than the cost of failing the SLA. A second example occurs, for example, with voice deliveries. Today, both WAV and MP3 file formats can be used to represent voice content. There may be different delivery pools associated with each format, with a cost preference to use one over the other (for example, to minimize bandwidth usage). Again, as the failure to meet an SLA policy becomes more threatening, the relative cost difference might be less than the cost of SLA policy failure.

b. Re-prioritizing a big job and a little one. As an example, there may be two jobs in the queue, only one port available, and the SLA for each indicates that a first delivery attempt must be made on both within 5 minutes. One job has penalty value 10 and will take 6 minutes to send. The second job has penalty value 9 and will take 2 minutes to send. To meet the SLA on both, Queue Manager 508 should choose the job with the lower penalty value and queue it first. The availability of only one port is known via the information provided by Delivery Resources 524, and the information about expected delivery times can be returned by Routing Manager 516. The algorithm applied to re-prioritize is a function of the top X recipient-jobs in the queue, delivery resource (e.g., port) availability, and expected delivery times. The value of X is set so as to minimize re-prioritization compute cycles while minimizing the potential for policy failure. In practice, X is unlikely to be higher than 5 or 10.

c. Re-prioritizing based on a performance percentage SLA. As described above, some SLAs are written so that the Service Provider has to meet the SLA 95% of the time over the course of a specified time period, such as month. Routing Manager 516, through its interaction with Dynamic System Information Storage 518, may identify that the percentage threshold for a particular subscriber or group of subscribers has been met or is being neared. Whereas, prior to that point, there was no significant penalty attached to failing to meet a specific SLA policy for a specific recipient-job, that penalty increases dramatically, for every new recipient-job, as the threshold is neared. Using this information, Queue Manager 508 should raise the penalty value of the recipient-job to a pre-defined high level (previously identified as coming from the subscriber's profile record) that will put it at or near the top of prioritized list 410.

The previous examples are representative cases where Queue Manager 508 modifies the penalty values of particular recipient-jobs, and re-creates prioritized lists 410a, 410b, and so on. In general, any dynamic event, presented to Queue Manager 508 through the "environmental feedback loop" of Delivery Resources 524 reports to Dynamic System Information Storage 518, may result in modifications to penalty value calculations.

Handling SLAs among Peering Service Providers

Service Providers often enter into peering relationships with each other. This allows one Service Provider to pass off traffic to another, for termination purposes. This topic deserves special attention, as it applies to policy handling.

Passing Policy Requests. Two providers may want the ability to pass traffic to one another whereby the originator expects SLA conformance from the terminator. The originator in this case is no different from an end-user in that it might have contracted for specific policies. However, the originator is not just one end-user, depending on the policies it has with its end-users. In other words, the originator needs the ability to present itself to the terminator as multiple different policy-user types. In a Policy-based Delivery Processing System, it is part of the peering protocol to request a Policy identifier on behalf of the sender. Preferably, these identifiers are in the terminator's terms, which may require mapping as described below.

Returning Policy Conformance Information. The terminating partner must also return to the originating partner information to determine whether or not an SLA policy was met. The Delivery Processing System passes SLA conformance information in its notifications to end users and in Message Data Records, passed to Log Manager 528. The terminating partner's Log Manager must, therefore, be set up to copy the appropriate records to the originating partner's system.

Mapping Different SLAs. There is an additional problem of mapping between peers'policies. That is, the originator's subscribers might have SLA policies with it that do not match any SLA offered by the terminator. There are at least 3 general classes describing the relationship between the SLA policies of the Originator Service provider and those of the Terminator Service Provider:

a. The terminator offers N different policies, and the originator offers only a subset of N. In this case, the Delivery Processing System will process policies correctly, so long as SLA IDs match. Preferably, the Originator does not forward SLAs having identifications that do not match.

b. The terminator offers N different policies, and the originator offers N plus at least one additional one. Preferably, the originator does not forward any jobs requesting the additional identifiers to the terminating partner, or should map those jobs as described in class (c).

C. The two parties offer completely different sets of SLA policies. Such peering relationships require a table mapping the originator's policy to the terminator's "best conforming policy."

It would be apparent to those having ordinary skill in the art that mapping as done in (c) could be performed in classes (a) and (b), or that a default SLA could be used where the SLA identifications do not match.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for managing compliance with service level agreements, comprising:

a storage device for storing information corresponding to at least one service level agreement, said information including penalties for failing to meet certain aspects of said at least one service level agreement;

a policy manager operable to use said stored information to determine an initial set of penalties for one or more delivery jobs, said policy manager being further operable to prioritize said one or more delivery jobs based on said initial set of penalties, wherein, during a processing sweep through said one or more delivery jobs, said policy manager is operable to modify said initial set of penalties and reprioritize the delivery jobs based on the modified penalties;

a queue manager operable to communicate with the policy manager to manage the one or more delivery jobs to be delivered in accordance with the delivery prioritization determined by the policy manager; and a delivery manager to deliver the one or more jobs in accordance with the delivery prioritization.

2. The system recited in claim 1, wherein said one or more delivery jobs are originated by one or more of a low-priority single-address subscriber, a high-priority single address subscriber, a broadcast subscriber, a free subscriber and an off-peak subscriber.

3. The system recited in claim 1, further comprising a dynamic storage device to store dynamic information relating to a delivery resource to which the one or more jobs can be delivered.

4. The system recited in claim 3, further comprising a routing manager to determining efficient routing for the one or more delivery jobs in the delivery prioritization.

5. The system recited in claim 1, further comprising a log manager that receives processing status information from the delivery manager and stores the processing information for generation of status reports.

6. The system recited in claim 1, wherein the policy manager determines a benefit value for each of the one or more jobs in the prioritized list.

7. A method for managing compliance with service level agreements, comprising the steps of:

storing information corresponding to at least one service level agreement, said information including penalties for failing to meet certain aspects of said at least one service level agreement;

determining, using the stored information, an initial set of penalties one or more delivery jobs and prioritizing said one or more delivery jobs based on said initial set of penalties;

managing said one or more delivery jobs to be delivered in accordance with the determined prioritization processing said one or more delivery jobs through at least one processing sweep;

during the at least one processing sweep, determining whether to modify any penalty of said initial set of penalties;

modifying each penalty for which a determination is made that the penalty be modified; and reprioritizing said one or more delivery jobs based on the modified penalties; and delivering the one or more jobs in accordance with the reprioritization.

8. The method recited in claim 7, further comprising the step of storing dynamic information relating to delivery resources to which the one or more jobs can be delivered.

9. The method recited in claim 8, further comprising the step of efficiently routing the one or more delivery jobs in the delivery prioritization.

10. The method recited in claim 7, further comprising the steps of:

receiving processing status information from the delivery manager; and storing the processing information.

11. The method recited in claim 10, further comprising the step of generating a status report from the stored processing information.

12. A system for delivering messages in one or more delivery jobs in accordance with one or more delivery requirements, comprising:

a static storage to store one or more delivery records, each delivery record having one or more delivery parameters;

a policy manager to obtain the one or more delivery records corresponding to one or more delivery jobs;

a queue manager operable to use said stored one or more delivery parameters to determine an initial set of penalties for said one or more delivery jobs, said queue manager being further operable to prioritize said one or more delivery jobs based on said initial set of penalties, wherein, during a processing sweep through said one or more delivery jobs, said queue manager is operable to modify said initial set of penalties and to reprioritize said one or more delivery jobs based on the modified penalties;

a routing manager to determine optimal routing for each job; and a delivery manager to deliver each delivery job in accordance with the delivery prioritization determined by the queue manager.

13. The system recited in claim 12, wherein each record contains one or more of a record identification, a time-to-first attempt, a time to last attempt and an initial priority.

14. The system recited in claim 13, where in each record further includes one or more of a priority increment, a minimum retry count and a minimum retry interval.

15. The system recited in claim 12, wherein if delivery of a delivery job is unsuccessful, the delivery manager retries delivery of the delivery job.

16. The system recited in claim 15, wherein the delivery manager only retires delivery of the delivery job when that retry is purposeful.

17. The system recited in claim 15, wherein prior to retry of delivery of the delivery job, the queue manager seeks new routing for the job.

18. The system recited in claim 12, wherein the optimal routing is determined on a least cost basis.

19. The method recited in claim 12, further comprising the step of least cost routing each delivery job.

20. A method for delivering messages in one or more delivery jobs in accordance with one or more delivery requirements, comprising the steps of:

storing one or more delivery records, each delivery record having one or more delivery parameters;

obtaining one or more stored delivery records, wherein said one or more delivery records corresponds to one or more delivery jobs;

generating, using the stored one or more delivery parameters, an initial set of penalties for said one or more delivery jobs, and to prioritize said one or more delivery jobs based on said initial set of penalties;

managing the one or more delivery jobs to be delivered in accordance with the generated prioritization;

processing said one or more delivery jobs through at least one processing sweep;

during the at least one processing sweep:

determining whether to modify any penalty of said initial set of penalties;

modifying each penalty for which a determination is made that the penalty be modified; and reprioritizing the one or more delivery jobs based on the modified penalties;

determining an optimal routing for each job; and delivering each delivery job in accordance with the re reprioritization of the one or more delivery jobs.

21. The method recited in claim 20, further comprising the step of retrying delivery of a delivery job when delivery of a delivery job is unsuccessful.

22. The method recited in claim 21, further comprising the step of determining new routing for the delivery job prior to retrying delivery of the delivery job.

23. The method recited in claim 21, further comprising the step of retrying delivery of the delivery job when that retry is purposeful.

24. A system for delivering messages in delivery jobs, comprising:

means for classifying each delivery job according to a type of subscriber originating the delivery job;

means for obtaining a service level agreement record corresponding to each delivery job, the service level agreement record obtained being dependent upon the type of subscriber originating the delivery job;

means for assigning a priority to each delivery job in accordance with the obtained service level agreement record, wherein each priority is determined in accordance with a penalty determined for each delivery job and wherein the penalty is determined using the obtained service level agreement record;

means for retrieving one or more delivery jobs;

means for determining a delivery prioritization of the one or more delivery jobs based on the assigned priorities of the one or more delivery jobs;

means for managing the one or more delivery jobs to be delivered in accordance with the delivery prioritization;

means for processing the one or more delivery jobs through at least one processing sweep;

means for determining whether to modify any of the penalties determined for the one or more delivery jobs during the at least one processing sweeps;

means for modifying each penalty for which a determination is made that the penalty be modified;

means for reprioritizing the one ore more delivery jobs based on modified penalties; and means for delivering the one or more delivery jobs in accordance with the delivery prioritization.

25. The system recited in claim 24, further comprising means for determining optimal routing for each delivery job.

26. The system recited in claim 24, wherein the type of subscriber originating the delivery job is one of a broadcast subscriber, a high-priority single address subscriber, a low-priority single address subscriber, a free subscriber and an off-peak subscriber.

27. The system recited in claim 24, further comprising means for retrying delivery of delivery jobs that are unsuccessful.

28. The system recited in claim 27, further comprising means for retrying delivery of delivery jobs that are unsuccessful only where the retry is purposeful.

29. A method for delivering messages in delivery jobs, comprising the steps of:

classifying each delivery job according to a type of subscribed originating the delivery job;

obtaining a service level agreement record corresponding to each delivery job, the service level agreement record obtained being dependent upon the type of subscriber originating the delivery job;

assigning a priority to each delivery job in accordance with the obtained service level agreement record, wherein each priority is determined in accordance with a penalty determined for each delivery job using the obtained service level agreement record;

retrieving one or more delivery jobs;

determining a delivery prioritization of one or more delivery jobs based on the assigned priorities of the one or more delivery jobs;

managing the one or more delivery jobs to be delivered in accordance with the delivery prioritization;

processing the one or more delivery jobs through at least one processing sweep;

during the at least on processing sweep:

determining whether to modify any of the penalties determined for the one or more delivery jobs;

modifying each penalty for which a determination is made that the penalty be modified; and reprioritizing the the one or more delivery jobs based on the modified penalties; and delivering each delivery job in accordance with the delivery prioritization.

30. The method recited in claim 29, further comprising the step of determining optimal routing for each delivery job.

31. The method recited in claim 29, further comprising retying delivery of delivery jobs that are unsuccessful.

32. The method recited in claim 31, further comprising retrying delivery of delivery jobs that are unsuccessful only where the retry is purposeful.

\* \* \* \* \*